(12) United States Patent
Ma et al.

(10) Patent No.: US 12,104,905 B2
(45) Date of Patent: Oct. 1, 2024

(54) MICROMACHINED GYROSCOPE AND ELECTRONIC PRODUCT USING SAME

(71) Applicant: AAC Kaitai Technologies (Wuhan) CO., LTD, Hubei (CN)

(72) Inventors: Zhao Ma, Shenzhen (CN); Shan Yang, Shenzhen (CN); Zhan Zhan, Shenzhen (CN); Xiao Kan, Shenzhen (CN); Hongtao Peng, Shenzhen (CN); Shitao Yan, Shenzhen (CN); Yang Li, Shenzhen (CN); Kahkeen Lai, Singapore (SG); Veronica Tan, Singapore (SG); Yan Hong, Shenzhen (CN)

(73) Assignee: AAC Kaitai Technologies (Wuhan) CO., LTD., Wuhan (CN)

( * ) Notice: Subject to any disclaimer, the term of this patent is extended or adjusted under 35 U.S.C. 154(b) by 294 days.

(21) Appl. No.: 17/879,812

(22) Filed: Aug. 3, 2022

(65) Prior Publication Data

US 2023/0204359 A1 Jun. 29, 2023

(30) Foreign Application Priority Data

Dec. 24, 2021 (CN) .......................... 202111595035.0

(51) Int. Cl.
*G01C 19/5712* (2012.01)
(52) U.S. Cl.
CPC ................. *G01C 19/5712* (2013.01)
(58) Field of Classification Search
CPC .......... G01C 19/5712; G01C 19/5733
See application file for complete search history.

(56) References Cited

U.S. PATENT DOCUMENTS

| | | | | |
|---|---|---|---|---|
| 2006/0112764 A1* | 6/2006 | Higuchi | ............. | G01C 19/5712 73/504.12 |
| 2009/0064780 A1* | 3/2009 | Coronato | ................ | G01P 15/18 73/504.08 |
| 2014/0345379 A1* | 11/2014 | Hammer | ............ | G01C 19/5712 73/504.12 |
| 2014/0352431 A1* | 12/2014 | Leclerc | ................... | G01P 15/18 73/504.04 |
| 2016/0341551 A1* | 11/2016 | Cook | .................. | G01C 19/5733 |
| 2016/0341552 A1* | 11/2016 | Kub | .................... | G01C 19/5684 |
| 2017/0261322 A1* | 9/2017 | Gattere | ............. | G01C 19/5712 |
| 2018/0058853 A1* | 3/2018 | Jia | ....................... | G01C 19/5712 |

(Continued)

*Primary Examiner* — David J Bolduc
(74) *Attorney, Agent, or Firm* — W&G Law Group

(57) ABSTRACT

The invention provides a micromachined gyroscope. The micromachined gyroscope includes a driving structure, a detection structure and a connection component. The driving structure includes a first moving component and a driving component. The driving component is used to drive the movement of the first moving component. The detection structure includes a second moving component and a detection component installed in the second moving component. The detection component is used to detect the movement distance of the second moving component along the third or fourth direction. The driving component is installed inside the first moving component, and the detection component is installed inside the second moving component. Greater drive of amplitude can be achieved at the same drive voltage, thereby increasing the sensitivity of the micromachined gyroscope.

10 Claims, 5 Drawing Sheets

(56) References Cited

U.S. PATENT DOCUMENTS

| | | | | |
|---|---|---|---|---|
| 2018/0172446 A1* | 6/2018 | Prikhodko | ........... | G01C 19/567 |
| 2018/0245946 A1* | 8/2018 | Weinberg | ........... | G01C 19/5684 |
| 2019/0072389 A1* | 3/2019 | Prati | ................... | G06F 12/0817 |
| 2019/0170514 A1* | 6/2019 | Trusov | ............... | G01C 19/5755 |
| 2019/0383612 A1* | 12/2019 | Geisberger | ......... | G01C 19/5747 |
| 2022/0057208 A1* | 2/2022 | Prikhodko | ......... | G01C 19/5712 |

* cited by examiner

MICROMACHINED GYROSCOPE AND ELECTRONIC PRODUCT USING SAME

FIELD OF THE PRESENT DISCLOSURE

The present invention relates to of gyroscopes, in particular to a micromachined gyroscope and an electronic product using such a gyroscope.

DESCRIPTION OF RELATED ART

The micromachined gyroscope is a typical angular velocity microsensor, which is widely used in the consumer electronics market due to its advantages of small size, low power consumption, and convenient processing. Usually, the geometry of the micromachined gyroscope is highly symmetrical, the driving mode and detection mode of the gyro are exactly the same, the sensitivity is high, and the structure is simple. However, the existing micromachined gyroscopes are limited in structure and spatial layout, making the sensitivity of the micromachined gyroscopes poor.

SUMMARY OF THE PRESENT INVENTION

The main purpose of the present invention is to provide a micromachined gyroscope to increase the sensitivity of the micromachined gyroscope.

Accordingly, the present invention provides a micromachined gyroscope, including: a driving structure, including a first moving component movable in a first direction or a second direction perpendicular to the first direction and a driving component installed inside the first moving component for driving the movement of the first moving component; a detection structure, including a second moving component movable along a third direction or a fourth direction perpendicular to the third direction and a detection component installed inside the second moving component for detecting the movement distance of the second moving component along the third direction or the fourth direction; a preset angle formed between the first direction and the third direction; and a connection component having one end connecting to the first moving component, and another end connecting to the second moving component.

As an option to improve the invention as described above, the driving component includes a first mounting hole and a driving device mounted on the first mounting hole; the detection component includes a second mounting hole and a detection device mounted on the second mounting hole.

As an option to improve the invention as described above, the driving structure includes a first circumferential beam, and the detection structure includes a second circumferential beam; the driving component is connected to the first moving component through the first circumferential beam, and the driving component is connected to the second moving component through the second circumferential beam.

As an option to improve the invention as described above, the driving structure further includes a first radial beam, the detection structure further includes a second radial beam, and the micromachined gyroscope also includes a fixed component; one end of the fixed component is connected to the driving component through the first radial beam, the other end of the fixed component is connected to the detection component through the second radial beam.

As an option to improve the invention as described above, an amount of the driving components is at least two along the movement direction of the first moving component, the number of the detection components is at least two along the second moving component the movement direction; the adjacent driving components are connected to the fixed component through the first radial beam, and the adjacent detection components are connected to the fixed component through the second radial beam.

As an option to improve the invention as described above, wherein an amount of the first moving component is multiple, and along the movement direction of the first moving component, the first moving components are symmetrically arranged; an amount of the second moving component is multiple, and the second moving component are symmetrically arranged along the movement direction of the second moving component; along the circumference of the micromachined gyroscope, at least one second moving component (21) is disposed between adjacent first moving components.

As an option to improve the invention as described above, the movement direction of the first moving component and the movement direction of the second moving component are uniformly distributed along the circumference of the micromachined gyroscope.

As an option to improve the invention as described above, the weight of the first moving component is greater than the weight of the second moving component.

As an option to improve the invention as described above, the driving device is a capacitive structure and/or an inductor structure, and the detection device is a capacitive structure and/or an inductor structure.

The invention further provides an electronic product, including: a main body, and a micromachined gyroscope as described above; wherein, the micromachined gyroscope is mounted on the body.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

Figure 1:
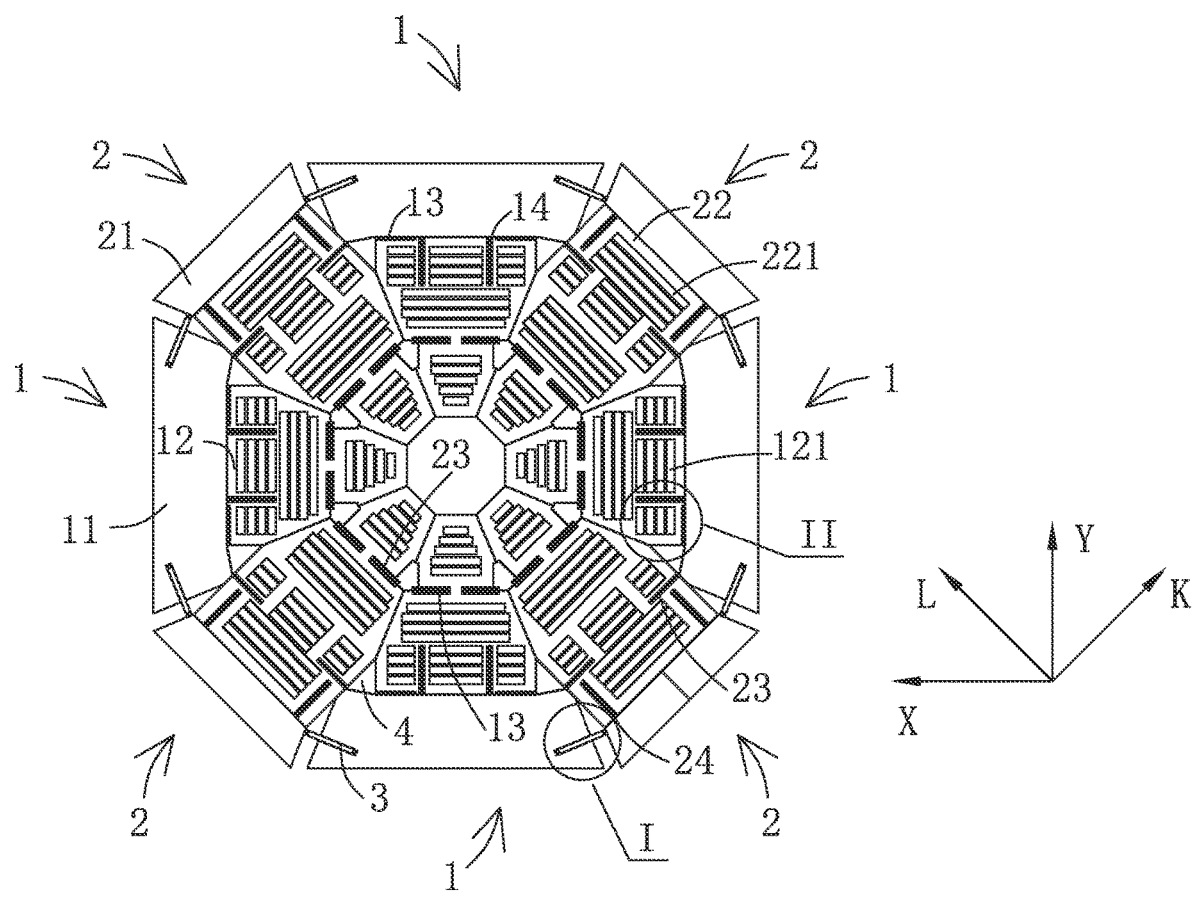
FIG. 1 is a structural diagram of a micromachined gyroscope in an embodiment provided by the present invention.

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

The terms used in the embodiments of the application are for the sole purpose of describing a particular embodiment and are not intended to limit the application. As used in the embodiment of the application and the appended claims, the singular forms "a," "the," and "the" are intended to include the plural forms as well, unless the context clearly dictates otherwise.

It should be understood that the term "and/or" used in this document is only an association relationship to describe associated objects, indicating that there may be three kinds of relationships, for example, a and/or B, which may indicate: There are three cases where A exists alone, A and B exist at the same time, and B exists alone. In addition, the character "/" in this document generally indicates that the related objects are an "or" relationship.

It should be noted that the orientation words such as "upper", "lower", "left" and "right" described in the embodiment of the application are described from the angles shown in the drawings, it should not be construed as a limitation on the embodiment of the application. Also, in this context, it should also be understood that when an element is referred to as being "on" or "under" another element, it can not only be directly connected "on" or "under" the other element, but also Indirectly connected "on" or "under" another element through middle elements.

An embodiment of the application in one aspect provides a micromachined gyroscope, as shown in FIG. 1, the micromachined gyroscope includes: a driving structure 1 and a detection structure 2. The driving structure 1 includes a first moving component 11 and a driving component 12. First moving component 11 can move along the first direction X or the second direction Y perpendicular to the first direction X, and the driving component 12 is mounted on the first moving component 11 for driving the movement of the first moving component 11. The number of the first moving component 11 is multiple, and the first moving components 11 are symmetrically arranged along the movement direction of the first moving component 11. The detection structure 2 includes a second moving component 21 and a detection component 22, the second moving component 21 can move along the third direction L or the fourth direction K perpendicular to the third direction L. The detection component 22 is installed on the second moving component 21, and is used for detecting the movement distance of the second moving component 21 along the third direction L or the fourth direction K. The number of the second moving component 21 is multiple, and the second moving components 21 are arranged symmetrically along the movement direction of the second moving component 21. Furthermore, along the circumferential direction of the micromachined gyroscope, at least one second moving component 21 is disposed between adjacent first moving components 11.

In this embodiment, both the first moving component 11 and the second moving component 21 are set in pairs, and the first moving component 11 and the second moving component 21 can be set as a single group or multiple groups. The application makes no special restrictions on the number of the first moving component 11 and the second moving component 21. When both first moving component 11 and second moving component 21 are two groups, there are first direction X, second direction Y, third direction L, and fourth direction K; when first moving component 11 and second moving component 21 are multiple groups, the movement directions of first moving component 11 and second moving component 21 increase accordingly. However, the movement directions of the first moving component 11 and the second moving component 21 must be uniformly distributed along the circumference of the micromachined gyroscope to improve the stability of the micromachined gyroscope. Any of the following embodiment taking two groups of first moving component 11 and two groups of second moving component 21 as examples. At this time, the first direction X is the 0° direction, the second direction Y is the 90° direction, the third direction is the 45° direction, and the fourth direction is the 145° direction.

Figure 2:
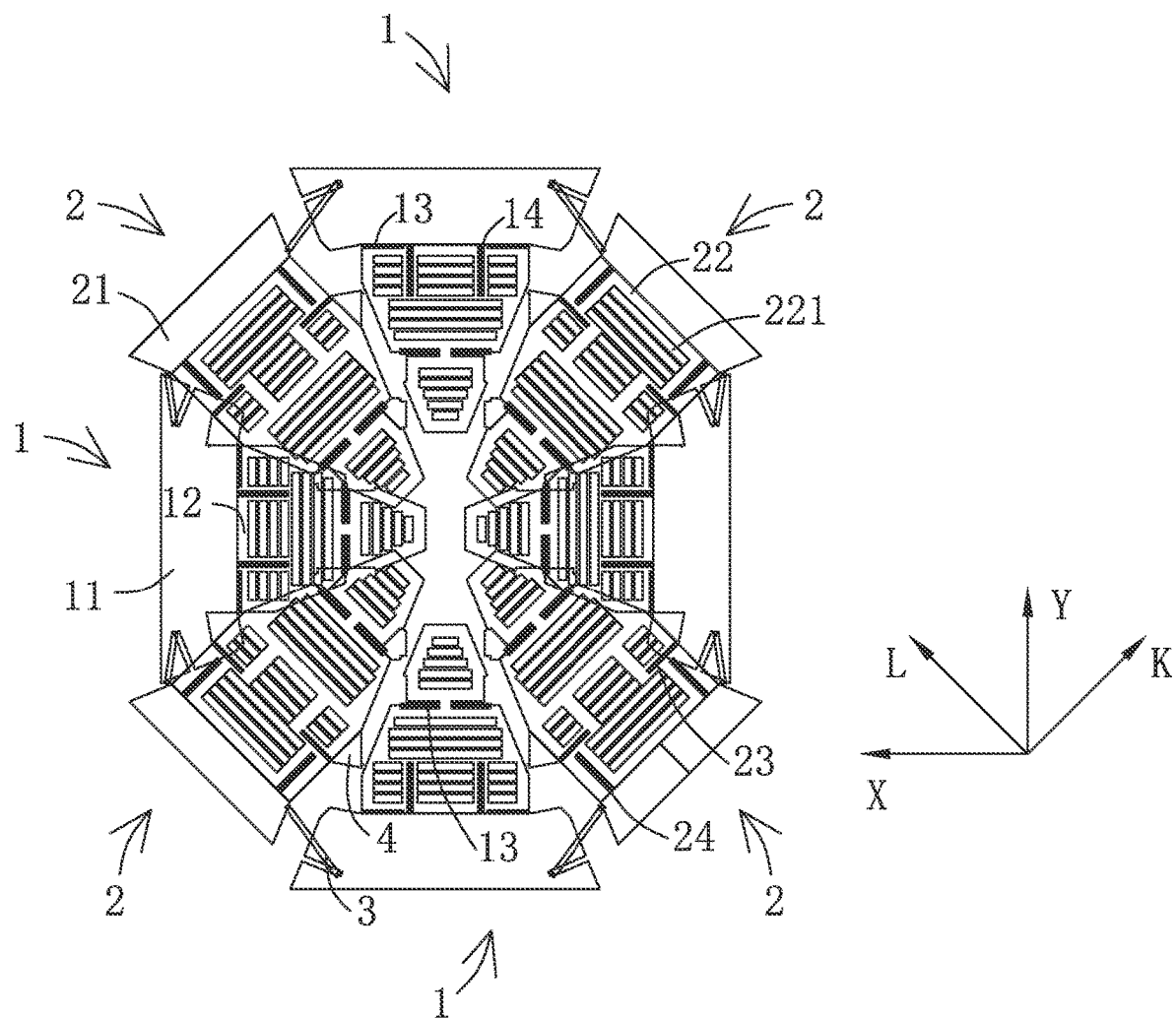
FIG. 2 is a structural diagram of the micromachined gyroscope in a driving mode in FIG. 1.
Figure 3:
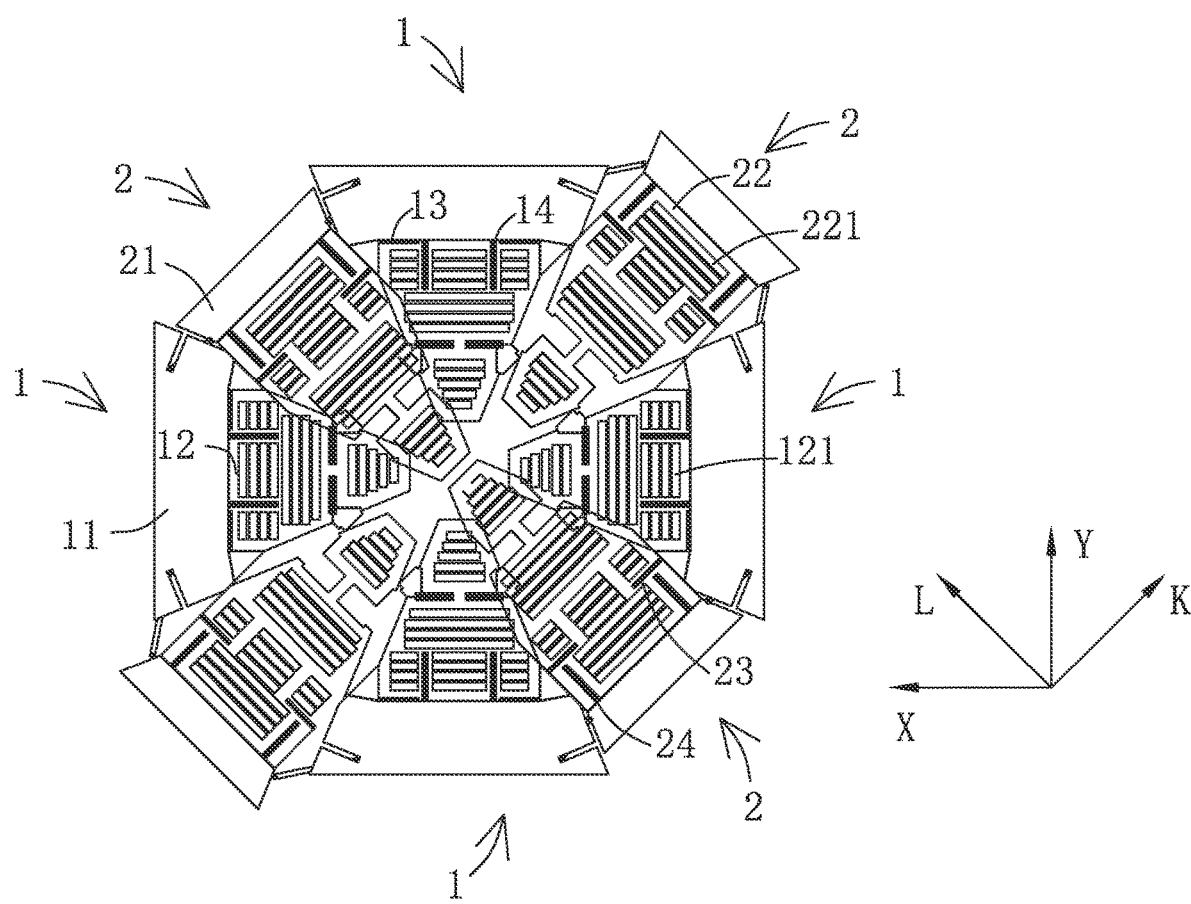
FIG. 3 is a structural diagram of the micromachined gyroscope in a detection mode in FIG. 1.

Wherein, in this embodiment, the micromachined gyroscope has a driving mode and a detection mode. As shown in FIG. 2, when the micromachined gyroscope is in the driving mode, the driving component 12 is able to control the first moving component 11 to move along the first direction X and the second direction Y, and generate Coriolis force along the first direction X and along the second direction Y. When the micromachined gyroscope receives the angular velocity applied from the outside, according to the Coriolis principle, the angular velocity and Coriolis force work together, and the resultant Coriolis force along the third direction L and fourth direction K is generated. The resultant Coriolis force will force the second moving component 21 to move along the third direction L and the fourth direction K, thereby exciting the detection mode of the micromachined gyroscope. At this time, the detection component 22 installed on the second moving component 21 detects the moving distance of the second moving component 21, and transmits the detection result to the computing system (not shown in the FIG.). The computing system calculates the magnitude of the angular velocity imposed on the micromachined gyroscope from the received data. Both the first moving component 11 and the second moving component 21 are arranged symmetrically along the movement direction, which can increase the smoothness of the movements of the first moving component 11 and the second moving component 21. Avoiding the unilateral movement of first moving component 11 or second moving component 21 in the micromachined gyroscope causes the micromachined gyroscope to yaw, thereby increasing the stability of the micromachined gyroscope. Along the circumferential direction of the micromachined gyroscope, at least one second moving component 21 is arranged between adjacent first moving components 11, that is, the first moving component 11 and the second moving component 21 are arranged at intervals. Both the first moving component 11 and the second moving component 21 can participate in the transmission of the Coriolis force. Thus, the Coriolis gain can be greatly improved, thereby improving the mechanical sensitivity.

In addition, in this embodiment, when the micromachined gyroscope only has a driving mode, the first moving component 11 moves along the first direction X and the second direction Y, and drives the second moving component 21 to move along the circumference of the micromachined gyroscope. At this time, the detection component 22 is in no displacement state, preventing the detection component 22 from moving and calculating an erroneous angular velocity. When the detection mode of the micromachined gyroscope is activated, the second moving component 21 moves along the third direction L and the fourth direction K, and drives the first moving component 11 to move along the circumference of the micromachined gyroscope. At this time, the driving component 12 is in a no displacement state, preventing the driving component 12 from interfering with the motion of the first moving component 11 and reducing the smoothness of the motion of the micromachined gyroscope. Therefore, when the micromachined gyroscope only has the driving mode, the detection component 22 is in the no displacement state, and when the detection mode of the micromachined gyroscope is activated, the driving component 12 is in the no displacement state. Thereby, the error of the measurement structure of the driving component 12 is reduced, and the accuracy of the movement direction of the first moving component 11 and the second moving component 21 is improved. The quadrature error of the first moving component 11 and the second moving component 21 is reduced. In turn, the stability of the movement of the micromachined gyroscope and the accuracy of the detection results are improved.

Figure 4:
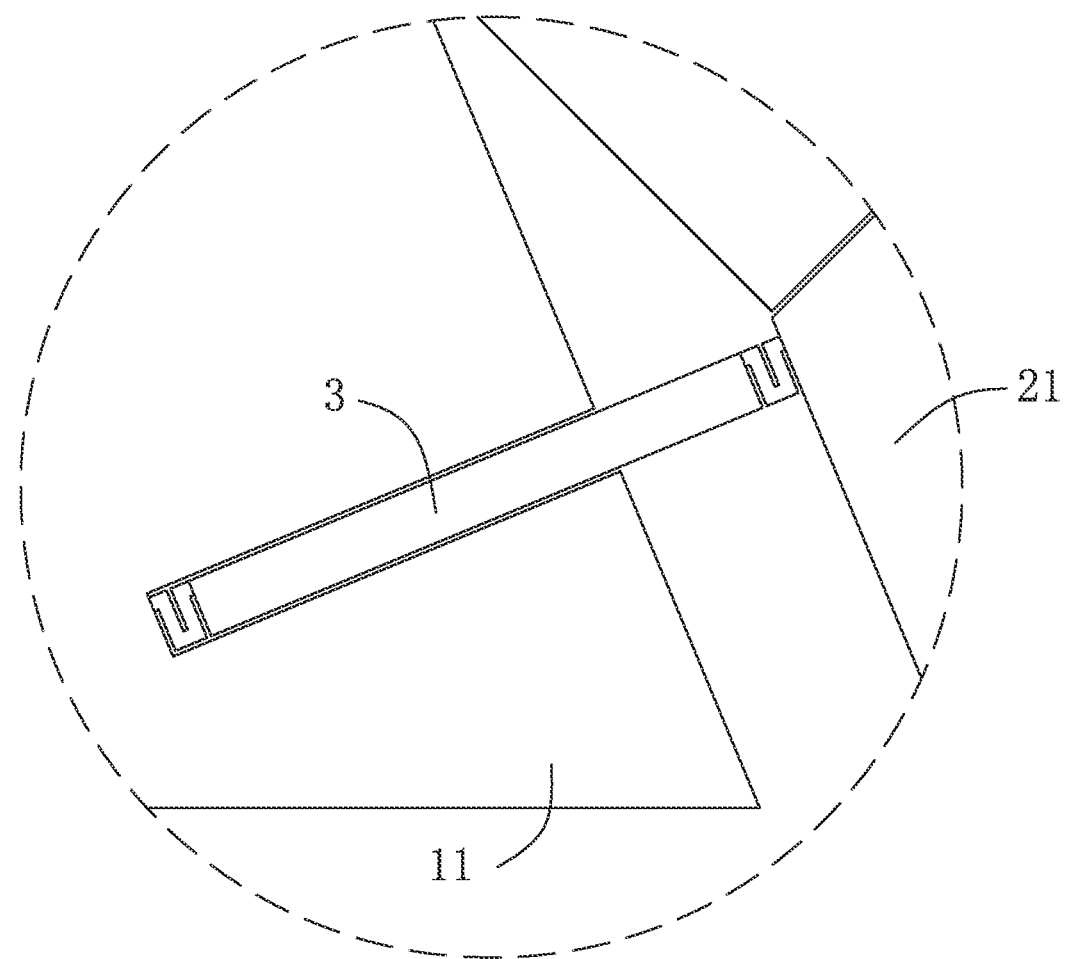
FIG. 4 is an enlarged view of part I in FIG. 1.

Specifically, as shown in FIG. 1, the driving component 12 is installed inside the first moving component 11. The detection component 22 is installed inside the second moving component 21. As shown in FIG. 4, the micromachined gyroscope also includes a connection component 3. One end of the connection component 3 is connected to the first moving component 11, and the other end of the connection component 3 is connected to the second moving component 21.

In this embodiment, the driving component 12 is installed inside the first moving component 11, and the detection component 22 is installed inside the second moving component 21, so that both the driving component 12 and the detection component 22 can be arranged inside the micromachined gyroscope. Therefore, the number of driving component 12 that can be installed in the micromachined gyroscope is increased, and a larger drive of amplitude can be realized when the driving voltage is the same, thereby improving the sensitivity of the micromachined gyroscope.

At the same time, the integration and utilization of the micromachined gyroscope have been improved. Wherein, as shown in FIG. 4, along the length direction of connection component 3, both ends of the connection component 3 can generate elastic deformation, and when the first moving component 11 or the second moving component 21 moves, the connection component 3 can stretch along the length direction, which prevents the first moving component 11 and the second moving component 21 from interfering with each other. Thereby, the stability of the movement of the first moving component 11 and the second moving component 21 is improved.

Also, the weight of the first moving component 11 is larger than the weight of the second moving component 21. During the processing, installation and use of the micromachined gyroscope, the Coriolis gain can be greatly improved by reducing the detection weight and/or increasing the driving weight, thereby improving the mechanical sensitivity.

Specifically, as shown in FIG. 1, the driving component 12 includes a driving device. The driving component 12 is provided with a first mounting hole 121, and the driving device is mounted on the first mounting hole 121. The detection component 22 includes a detection device, the detection component 22 is provided with a second mounting hole 221, and the detection device is mounted in the second mounting hole 221.

In this embodiment, the driving device is used to control the motion of the first moving component 11. The detection device is used to detect the distance that the second moving component 21 moves along the third direction L or fourth direction K. The driving device is mounted on the first mounting hole 121, and the detection component 22 is provided with the second mounting hole 221. The installation structure of the driving device and the detection device is simplified to facilitate the installation of the driving device and the detection device.

Wherein, in this embodiment, the driving component 12 is provided with a plurality of first mounting holes 121, and the detection component 22 is provided with a plurality of second mounting holes 221 to increase the mounting positions of the driving device and the detection device. The layout area of the driving device and detection device is improved, thereby increasing the driving amplitude and detection signal. This in turn increases the sensitivity of the micromachined gyroscope.

More specifically, the driving device is a capacitive structure and/or an inductor structure, and the detection device is a capacitive structure and/or an inductor structure.

In this embodiment, the implementations of driving device and detection device include but are not limited to capacitive structure and inductor structure. The application does not specifically limit the specific implementation of the driving device and detection device. In order to increase the flexibility of the structure of the driving device and the detection device, the scope of application of the driving device and the detection device is increased. In this embodiment, taking both the driving device and the detection device as an example of a capacitive structure, when the micromachined gyroscope only has the driving mode, the distance between the positive structure and the negative structure of the driving capacitor of the driving device changes.

Thereby, the first moving component 11 moves along the first direction X and the second direction Y. When the micromachined gyroscope receives the externally applied angular velocity, the second moving component 21 moves along the third direction L and fourth direction K under the action of the resultant Coriolis force. The distance between the positive structure and the negative structure of the detection capacitor is changed to detect the movement distance of the second moving component 21. The detection capacitor transmits the capacitance change value to the computing system. The calculation system calculates the magnitude of the angular velocity applied to the micromachined gyroscope from the received values.

Therefore, setting the driving device and the detection device as a capacitive structure and/or an inductor structure can facilitate the control of the motion of the first moving component 11 and the second moving component 21. At the same time, it is convenient to detect the movement distance of the second moving component 21, thereby simplifying the structure of the driving device and the detection device. Further, the structure of the micromachined gyroscope is simplified, and the installation space of the micromachined gyroscope is reduced.

In any of the above embodiments, as shown in FIG. 1, the driving structure 1 includes multiple first radial beams 13. The detection structure 2 includes a plurality of second radial beams 23, and the micromachined gyroscope also includes a plurality of fixed components 4. One end of the fixed component 4 is connected to the driving component 12 through the first radial beam 13, and the other end of the fixed component 4 is connected to the detection component 22 through the second radial beam 23; along the movement direction of the first moving component 11, the adjacent driving components 12 are connected to the fixed components 4 through the first radial beam 13. Along the movement direction of the second moving component 21, the adjacent detection components 22 are connected to the fixed components 4 through the second radial beam 23. The driving structure 1 also includes a plurality of first circumferential beams 14, and the detection structure 2 also includes a plurality of second circumferential beams 24.

Figure 5:
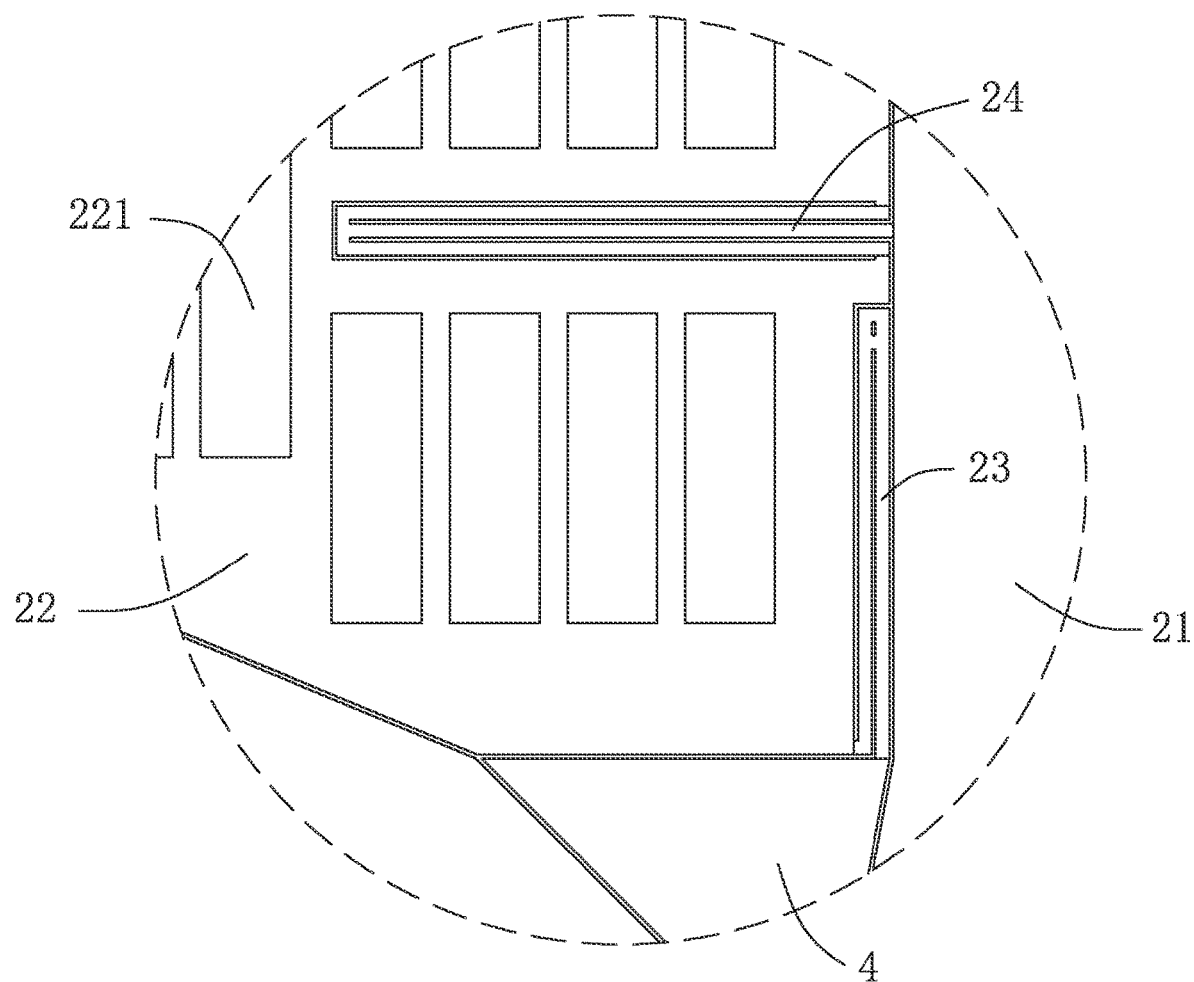
FIG. 5 is an enlarged view of part II in FIG. 1.

The driving component 12 is connected to the first moving component 11 through the first circumferential beam 14. The driving component 12 is connected to the second moving component 21 through the second circumferential beam 24. Wherein, as shown in FIG. 5, along the movement direction of the first moving component 11, the deformation of the first radial beam 13 can occur. Along the direction perpendicular to the motion of the first moving component 11, the deformation of the first circumferential beam 14 can occur. Along the movement direction of the second moving component 21, the deformation of the second radial beam 23 can occur. Along the direction perpendicular to the movement of the second moving component 21, the deformation of the second circumferential beam 24 can occur. The damage of the first radial beam 13, the first circumferential beam 14, the second radial beam 23 and the second circumferential beam 24 is avoided under large force. Thus, the service life of first radial beam 13, first circumferential beam 14, second radial beam 23 and second circumferential beam 24 are prolonged, which increases stability to first moving component 11 and second moving component 21 movements. In turn, the service life and working stability of the micromachined gyroscope are increased.

A second aspect of the embodiment of the application provides an electronic product, the electronic product includes: a body and a micromachined gyroscope described in any one of the embodiments above, the micromachined gyroscope is mounted to the body.

During the working process of electronic product, the micromachined gyroscope can calculate the angular velocity of electronic product to facilitate the control of electronic product. The micromachined gyroscope is arranged with a high sensitivity, which enables the use of electronic product to be improved.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A micromachined gyroscope, including:
   a driving structure, including a first moving component movable in a first direction or a second direction perpendicular to the first direction and a driving component installed inside the first moving component for driving the movement of the first moving component;
   a detection structure, including a second moving component movable along a third direction or a fourth direction perpendicular to the third direction and a detection component installed inside the second moving component for detecting the movement distance of the second moving component along the third direction or the fourth direction;
   a preset angle formed between the first direction and the third direction; and
   a connection component having one end connecting to the first moving component, and another end connecting to the second moving component.

2. The micromachined gyroscope as described in claim 1, wherein the driving component includes a first mounting hole and a driving device mounted on the first mounting hole; the detection component includes a second mounting hole and a detection device mounted on the second mounting hole.

3. The micromachined gyroscope as described in claim 1, wherein the driving structure includes a first circumferential beam, and the detection structure includes a second circumferential beam; the driving component is connected to the first moving component through the first circumferential beam, and the driving component is connected to the second moving component through the second circumferential beam.

4. The micromachined gyroscope as described in claim 3, wherein the driving structure further includes a first radial beam, the detection structure further includes a second radial beam, and the micromachined gyroscope also includes a fixed component; one end of the fixed component is connected to the driving component through the first radial beam, the other end of the fixed component is connected to the detection component through the second radial beam.

5. The micromachined gyroscope as described in claim 4, wherein, an amount of the driving components is at least two along the movement direction of the first moving component, the number of the detection components is at least two along the second moving component the movement direction; the adjacent driving components are connected to the fixed component through the first radial beam, and the adjacent detection components are connected to the fixed component through the second radial beam.

6. The micromachined gyroscope as described in claim 1, wherein an amount of the first moving component is multiple, and along the movement direction of the first moving component, the first moving components are symmetrically arranged; an amount of the second moving component is multiple, and the second moving component are symmetrically arranged along the movement direction of the second moving component; along the circumference of the micromachined gyroscope, at least one second moving component (21) is disposed between adjacent first moving components.

7. The micromachined gyroscope as described in claim 6, wherein the movement direction of the first moving component and the movement direction of the second moving component are uniformly distributed along the circumference of the micromachined gyroscope.

8. The micromachined gyroscope as described in claim 1, wherein the weight of the first moving component is greater than the weight of the second moving component.

9. The micromachined gyroscope as described in claim 2, wherein the driving device is a capacitive structure and/or an inductor structure, and the detection device is a capacitive structure and/or an inductor structure.

10. An electronic product, including:
    a main body, and a micromachined gyroscope as described in claim 1;
    wherein, the micromachined gyroscope is mounted on the body.

* * * * *